(12) United States Patent
Yoo et al.

(10) Patent No.: US 7,791,841 B2
(45) Date of Patent: Sep. 7, 2010

(54) HEAD SLIDER FOR HARD DISK DRIVE

(75) Inventors: Jin-gyoo Yoo, Seongnam-si (KR); No-yeol Park, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 721 days.

(21) Appl. No.: 11/649,205

(22) Filed: Jan. 4, 2007

(65) Prior Publication Data

US 2007/0159729 A1    Jul. 12, 2007

(30) Foreign Application Priority Data

Jan. 6, 2006    (KR)    .................. 10-2006-0001671

(51) Int. Cl.
*G11B 21/21*    (2006.01)
(52) U.S. Cl. .................................... 360/294.7
(58) Field of Classification Search .............. None
See application file for complete search history.

(56) References Cited

U.S. PATENT DOCUMENTS

| | | | |
|---|---|---|---|
| 6,760,182 B2 * | 7/2004 | Bement et al. ............ | 360/75 |
| 6,765,765 B2 * | 7/2004 | Bement et al. ............ | 360/294.3 |
| 6,943,990 B1 | 9/2005 | Yokoyama et al. | |
| 6,954,339 B2 * | 10/2005 | Bement et al. ............ | 360/294.7 |
| 6,992,865 B2 * | 1/2006 | Thurn et al. ............. | 360/294.7 |
| 7,187,514 B2 | 3/2007 | Takagi et al. | |
| 7,274,538 B2 * | 9/2007 | Thurn et al. ............. | 360/294.7 |

FOREIGN PATENT DOCUMENTS

| | | |
|---|---|---|
| CN | 1717737 A | 1/2006 |
| JP | 11-176121 | 7/1999 |
| KR | 10-1997-0044424 | 8/1997 |
| KR | 10-2001-7003471 | 3/2001 |
| KR | 10-2003-0033033 | 4/2003 |

OTHER PUBLICATIONS

Chinese Patent Office, Office Action dated Jan. 22, 2010.

* cited by examiner

*Primary Examiner*—Mark Blouin
(74) *Attorney, Agent, or Firm*—Volentine & Whitt, PLLC (57) ABSTRACT

A head slider for a hard disk drive is disclosed. The slider includes an operation device associated with a read/write head and adapted to change the flying height between the read/write head and a disk in relation to temperature. The operation device may be formed from a material that expands and contracts in relation to temperature in order to change the flying height, or a material that undergoes bending deformation in relation to temperature in order to change the flying height.

6 Claims, 10 Drawing Sheets

HEAD SLIDER FOR HARD DISK DRIVE

BACKGROUND OF THE INVENTION

1. Field of the Invention

The present invention relates to a head slider for a hard disk drive. More particularly, the invention relates to a head slider for a hard disk drive where a read/write head for storing and reproducing data is attached.

This application claims the benefit of Korean Patent Application No. 10-2006-0001671, filed on Jan. 6, 2006, the subject matter of which is hereby incorporated by reference.

2. Description of the Related Art

Hard disk drives (HDDs) are commonly used within various host devices, such as personal computers (PCs) to store data. Data is read from and written to a rotating disk within the HDD using a read/write head. The read/write head accesses data from the disk while floating above the surface of the disk by a predetermined height (referred to as its "flying height").

In the conventional HDDs, the read/write head floats over the disk (i.e., the magnetic surface of the disk which acts as a recording medium) during read/write operations at a constant flying height—regardless of the actual operating temperature of the HDD. Since the flying height of the read/write head is always maintained at a constant value despite changes in the operating temperature of the HDD, data is sometimes lost during read/write operations at low temperatures, due to thermally influenced changes in the electro-magnetic properties of the disk.

At high temperatures, the pole tip of the head thermally expands and sometimes protrudes towards the disk to a degree outside of design specifications. In other words, a so-called thermal pole tip protrusion phenomenon occurs. When this phenomenon occurs, the conventional assumptions associated with maintaining a constant flying height for the head causes errant spacing between the pole tip and the disk. Such errant spacing may lead to loss of data during read/write operations or increase the possibility of the pole tip impacting the disk as the result of an externally applied force. Such impacts may lead to permanent damage of the head and/or disk.

SUMMARY OF THE INVENTION

In one embodiment, the invention provides a head slider for a hard disk drive, the head slider comprising; a slider inducing generation of a lift force from a rotating disk, a read/write head provided on a lower surface of the slider and facing the disk and adapted to performing read/write operations while maintained at a defined flying height at an assumed room temperature, and an operation device associated with the read/write head and adapted to change the flying height of the read/write head in relation to temperature.

In one aspect, the operation device is formed from a material that expands and contracts in relation to temperature in order to change the flying height. In another aspect, the operation device is formed from a material that undergoes bending deformation in relation to temperature in order to change the flying height.

In another embodiment, the invention provides a head slider for a hard disk drive including a slider inducing generation of a lift force from a rotating disk and a read/write head attached to an under surface of the slider facing a disk, the read/write head adapted to perform read/write operations while separated from the disk by a flying height, the slider comprising; at least one support beam extending in a direction, and an operation member arranged parallel with the support beam, having a rear end portion fixed to the support beam and a tip end portion attaching the read/write head, and adapted to change the flying height in relation to temperature.

DESCRIPTION OF EMBODIMENTS

Figure 1:
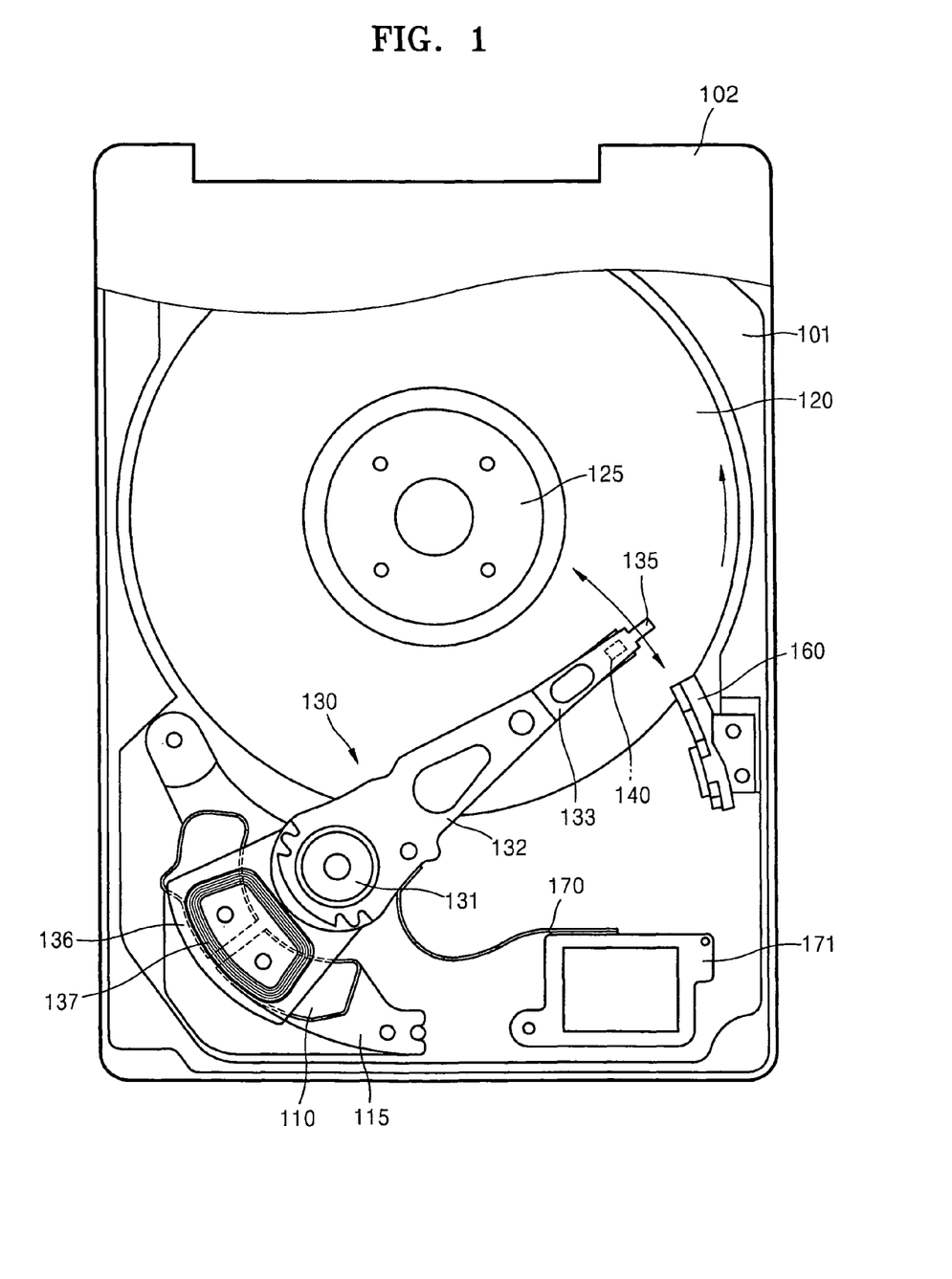
FIG. 1 is a plan view of a hard disk drive having a head slider according to an embodiment of the invention.

Referring to FIG. 1, a Hard Disk Drive (HDD) having a head slider according to an embodiment of the invention includes in the illustrated embodiment, a spindle motor 125 adapted to rotate a disk 120 (as one example of recording media), and an actuator 130 adapted to move one or more read/write head(s) adapted to record and/or reproducing data over the surface of disk 120. (A single or multiple disks may be attached to spindle motor 125, but for the sake of clarity only a single disk will be referred to hereafter. Similarly, a single read/write head will be described bearing in mind that multiple heads might alternately be used).

The spindle motor 125 is installed on a base member 101 of the HDD. The disk 120 is rotated by the spindle motor 125 at a constant angular velocity.

The actuator 130 includes an actuator pivot 131 installed on the base member 101, a swing arm 132, a suspension 133, a head slider 140, a coil support portion 136, and a voice coil motor (VCM). The swing arm 132 is rotatably coupled to the actuator pivot 131. The suspension 133 is coupled to an end portion of the swing arm 132 and supports the head slider 140 to be elastically biased toward the surface of the disk 120. The coil support portion 136 is provided at the rear end portion of the swing arm 132.

The voice coil motor provides a driving force to rotate the swing arm 132 in a direction following the Fleming's left hand rule by the interaction of a magnetic field formed by a magnet 110 and current input to a VCM coil 137. The VCM coil 137 is assembled on the coil support portion 136. The magnet 110 is arranged in the respective upper and lower portions of the VCM coil 137 to face the same and attached to a yoke 115 and supported thereby.

A flexible printed circuit 170 is connected to one side of the actuator 130. In accordance with a read/write operation or a one of many functions associated with an unloading operation, as communicated through the flexible printed circuit 170, the actuator 130 will move over disk 120 to execute the read/write operation, or "unload" the head from disk 120. Unloading operations are conventionally understood and are generally characterized by movement of the head into a safe resting position located in a non-recoding interior portion of the disk 120 or outside the perimeter edge of disk 120.

The flexible printed circuit 170 receives a controlled drive signal or power from a circuit board (not shown) arranged under the base member 101. To this end, a bracket 171 connecting the flexible printed circuit 170 and the circuit board is installed at a corner portion of the base member 101. The spindle motor 125 and the actuator 130 are accommodated in an inner space provided by the base member 101 and the cover member 102 which are coupled facing each other. The base member 101 and the cover member 102 prevent intrusion of external foreign materials, protect parts accommodated therein, and prevent the external transmission of driving noise.

When power is applied to the HDD, disk 120 rotates at a high speed through action of the spindle motor 125. An air flow across the surface of disk 120 results. The head slider 140 performs its function while floating to a predetermined flying height over disk 120 due to a balance between the lifting force of the directed air flow and an elastic pressing force caused by the suspension 133 supporting the head slider 140.

When power to the HDD is interrupted, the head slider 140 is unloaded from disk 120 by an unloading operation. As the lift tab 135 at the end of the suspension 133 is guided along a parking ramp 160 located outside the outer perimeter of disk 120, the head slider 140 is accommodated on the parking ramp 160.

Figure 2:
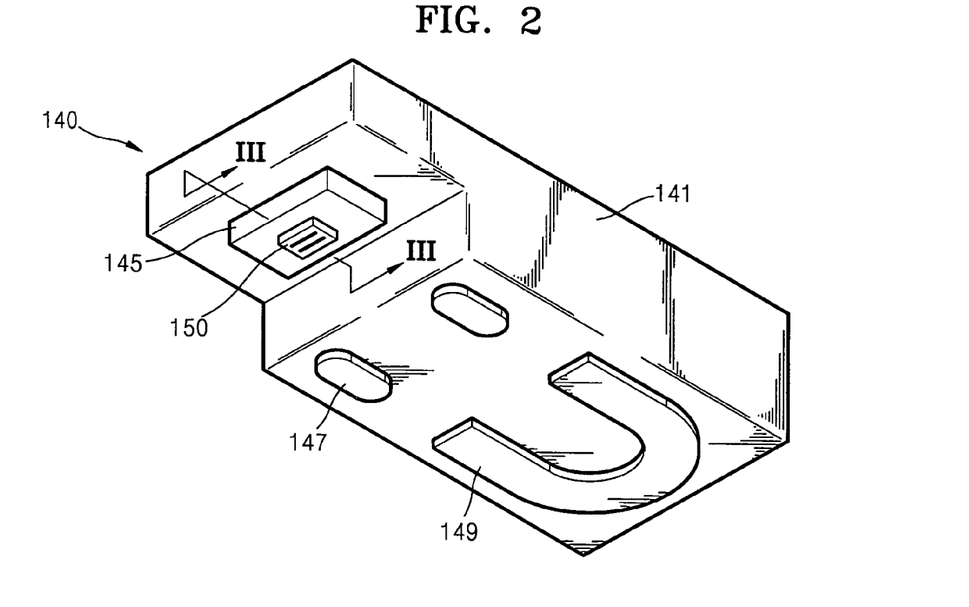
FIG. 2 is a perspective view of the head slider of FIG. 1.

FIG. 2 is a perspective view further illustrating the head slider 140 of FIG. 1. The head slider 140 includes a slider 141 as a support structure and a read/write head 150 performing read/write operations. Air bearing surfaces 147 and 149 for guiding a lift force from the rotating disk 120 are provided on a bottom surface of the slider 141 facing the disk 120. An upwardly stepped surface is provided at one end of the slider 141.

An operation device 145 mounting the read/write head 150 is attached to the stepped surface. The read/write head 150, as supported on the stepped surface, may be maintained at a safe distance from disk 120 to prevent impacts. The slider 141, which acts as a support structure for the read/write head 150, is preferably formed of a non-magnetic material having superior rigidity and anti-abrasion features that inhibit recording/reproducing errors due to electro-magnetic interference. For example, in one embodiment the slider 141 may be made of a ceramic material such as alumina ($Al_2O_3$) and/or titanium oxide (TiC).

The operation device 145 may be made from a shaped memory alloy (SMA) actuating material that vertically expands and contracts as its inherent crystalline structure changes in response to temperature changes. Since the operation device 145 thermally expands or contracts, the separation distance between the read/write head 150 and the disk 120 (i.e., the flying height of the read/write head 150) increases or decreases as a function of temperature. In the illustrated embodiment, the operation device 145 passively responds to temperature changes in order to vary the flying height of the read/write head 150. Through an inverse temperature to vertical displacement capability provided by the operation device 145, the read/write head 150 more closely approaches the disk 120 under the effect of lower temperatures, thereby decreasing the flying height, or more distantly separates the read/write head 150 from disk 120 under the effect of higher temperatures, thereby increasing the flying height. This capability and enabling embodiments will be described in some additional detail hereafter.

Figure 3:
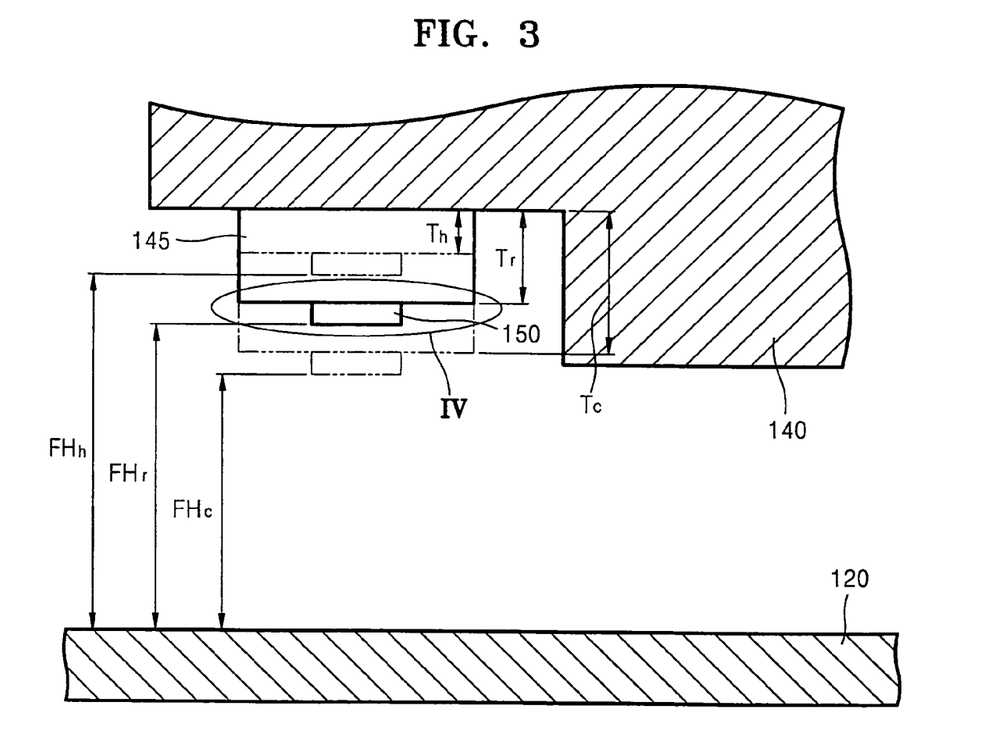
FIG. 3 is a vertical sectional view taken along the line III-III of FIG. 2.

FIG. 3 is a vertical cross-sectional view taken along the line III-III of FIG. 2. Referring to FIG. 3, the operation device 145 to which the read/write head 150 is attached is supported on the upwardly stepped surface of the slider 141. The operation device 145 vertically expands or contracts in accordance with temperature changes. Accordingly, the flying height of the read/write head 150 attached to the operation device 145 varies with temperature.

For example, at room temperature, the operation device 145 is assumed to have a vertical thickness of "Tr". At relatively lower temperatures, the operation device 145 expands to have a thickness of "Tc" greater than Tr. At relatively higher temperatures, the operation device 145 contracts to have a thickness of "Th" less than Tr. Thus, the thermally induced vertical expansion and contraction of the operation device 145, adjusts the flying height of the read/write head 150 attached to the operation device 145. (See, the resulting exemplary flying heights FHr, FHc, and FHh of FIG. 3, for example).

Figure 4:
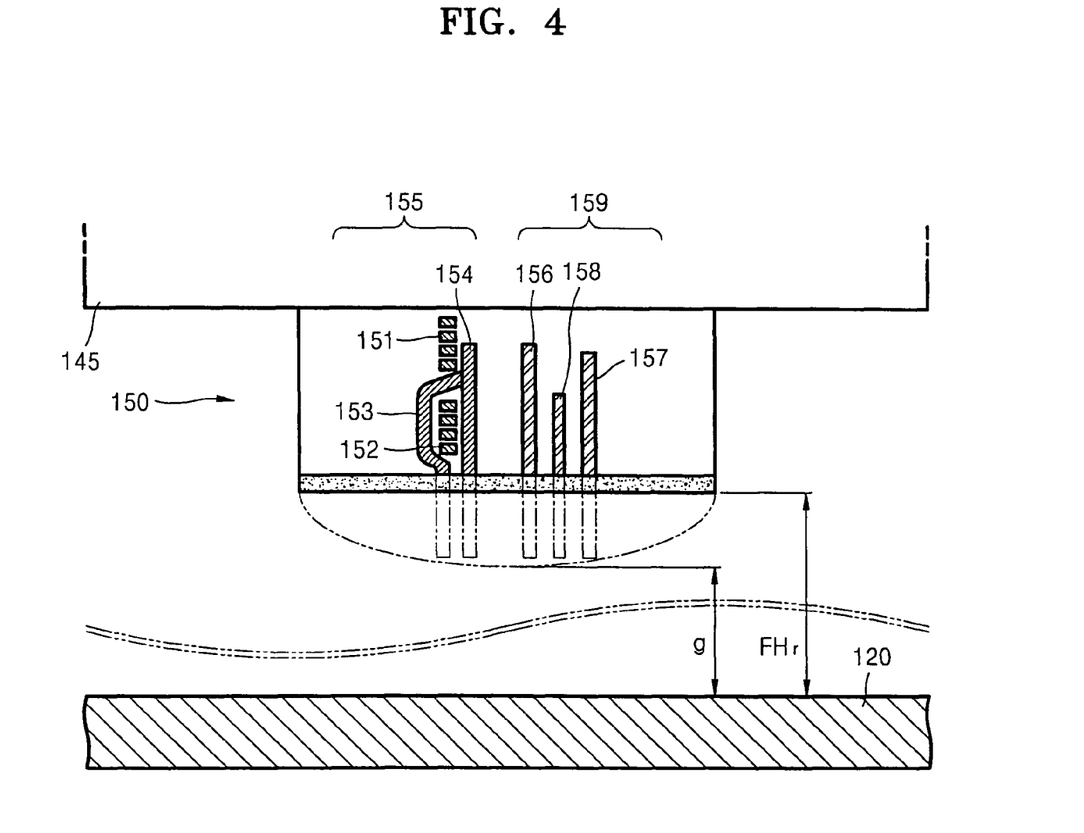
FIG. 4 is an enlarged vertical sectional view of the IV portion of FIG. 3.

FIG. 4 is an enlarged vertical cross-sectional view of region IV indicated in FIG. 3. Referring to FIG. 4, the read/write head 150 includes a recording portion 155 adapted to record (write) data on disk 120 and a reading portion 159 adapted to reproduce (read) data from the disk 120. The recording portion 155 includes first and second poles 153 and 154 providing leakage magnetic flux with respect to disk 120 and induction coils 151 and 152 forming an electrical current path adapted to induce a magnetic field between the first and second poles 153 and 154. The first and second poles 153 and 154 may be formed from a magnetic material such as FeNi. A signal indicative of data to be written to disk 120 is applied from a circuit board (not shown) to the inductance coils 151 and 152.

The reading portion 159 includes first and second shields 156 and 157 arranged in parallel and separated by predetermined interval. The reading portion 159 also includes a magneto-resistance (MR) sensor 158 arranged between the first and second shields 156 and 157. A magnetic signal indicative of data read from disk 120 is detected by MR sensor 158. To prevent damage, a coating film formed, for example, from diamond like carbon (DLC), is formed on the lower surface of the recording portion 155 and the reading portion 159.

Figure 5:
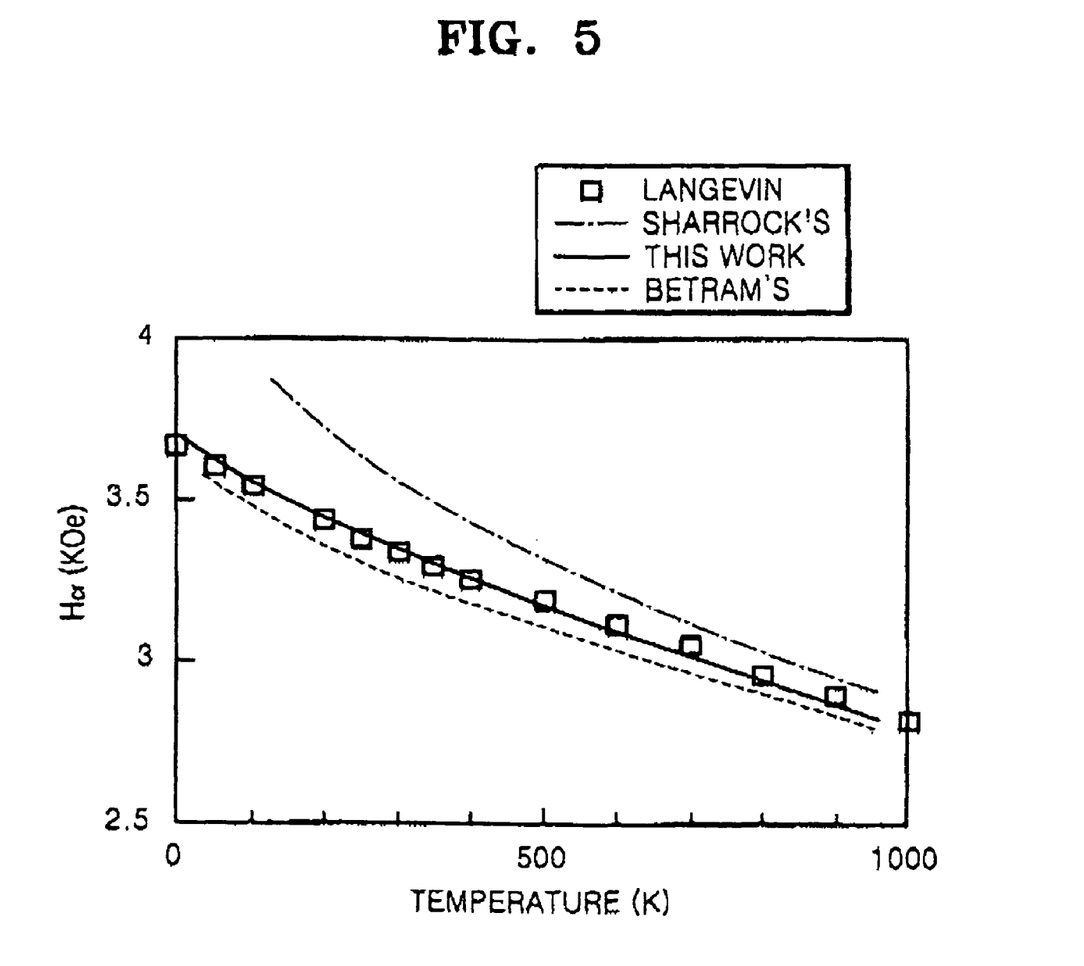
FIG. 5 is a graph showing the coercivity of a magnetic material that changes according to the temperature.

FIG. 5 is a graph showing the coercivity of a magnetic material that changes with temperature, that is, the profile of coercivity to M60 LMR that is a magnetic material applied to the disk. In FIG. 5, other profiles produced by various conventional approaches (as indicated by the leading researchers name) are shown for comparative purposes in relation to an embodiment of the invention ("this work"). It may be seen that across the illustrated temperature range, the operating temperature and coercivity vary in almost an inverse linear manner one to another. That is, as operating temperature decreases, the coercivity of the magnetic material increases. The change in coercivity of the magnetic material as a function of operating temperature is due to the magnetic properties of the constituent material which change as the anisotropy of the magnetic material increases or decreases in response to changes in temperature. When the coercivity of disk 120 increases, a magnetic property may be stably maintained—which is advantageous to the maintenance of recorded data. However, as the coercivity of disk 120 increases, it responds less sensitively to an applied magnetic field.

Additionally, at lower temperatures, the magnetic switching needed to generate the applied magnetic field is inhibited, thereby resulting in weak write signals (fields). Accordingly, at lower temperatures in which the coercivity increases, it is preferable to allow the read/write head 150 to approach the disk 120 more closely, such that the disk 120 is exposed to a relatively more dense magnetic flux.

Figure 6A:
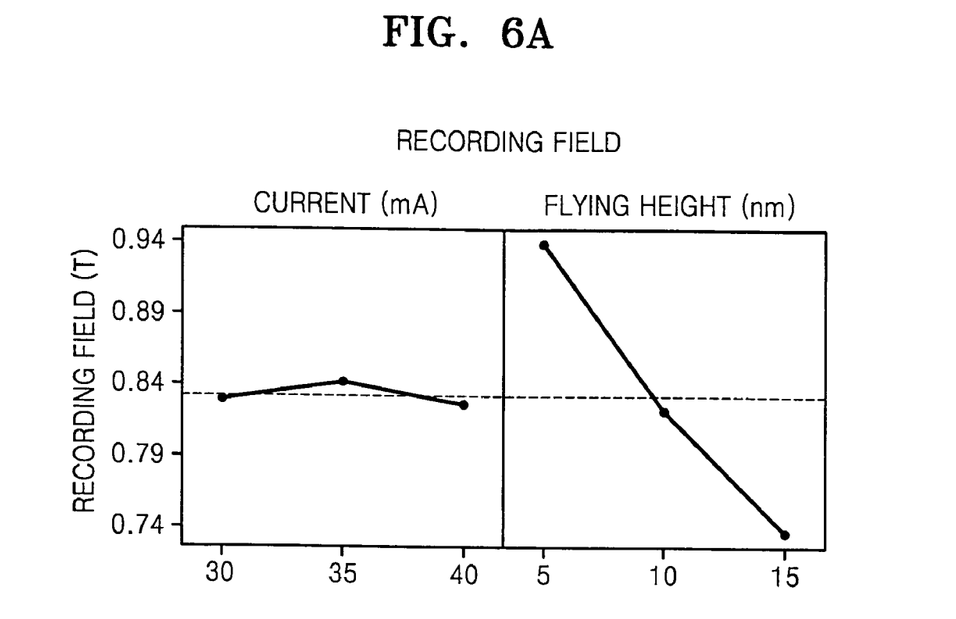
FIG. 6A is a graph showing the change in the recording field according to the application current and the flying height of the read/write head, as a profile of the recording field.
Figure 6B:
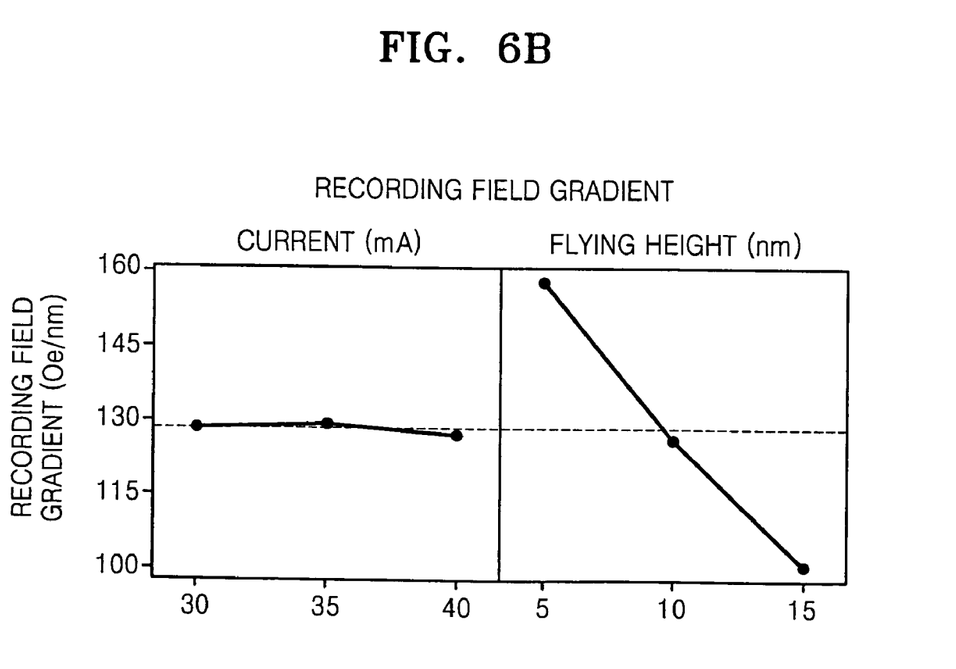
FIG. 6B is a graph showing the change in the spatial gradient according to the application current and the flying height of the read/write head, as a profile of the spatial gradient in the recording field.

FIG. 6A is a graph showing variations in the recording field as a function of applied current and flying height of the read/write head. FIG. 6B is a related graph showing variations in the spatial recording field gradient as a function of applied current and flying height of the read/write head. In FIGS. 6A and 6B, the left side graph is a profile according to the intensity of current applied to the read/write head 150 while the right side graph is a profile according to the flying height of the read/write head 150. As the intensity of current applied to the read/write head 150 increases and the flying height of the read/write head 150 decreases, the recording field, or the spatial gradient with respect to the recording field, gradually increases. However, the change in the recording field, or the spatial gradient with respect to the recording field, is gentle to the current signal, but radical to the flying height of the read/write head 150.

Figure 6C:
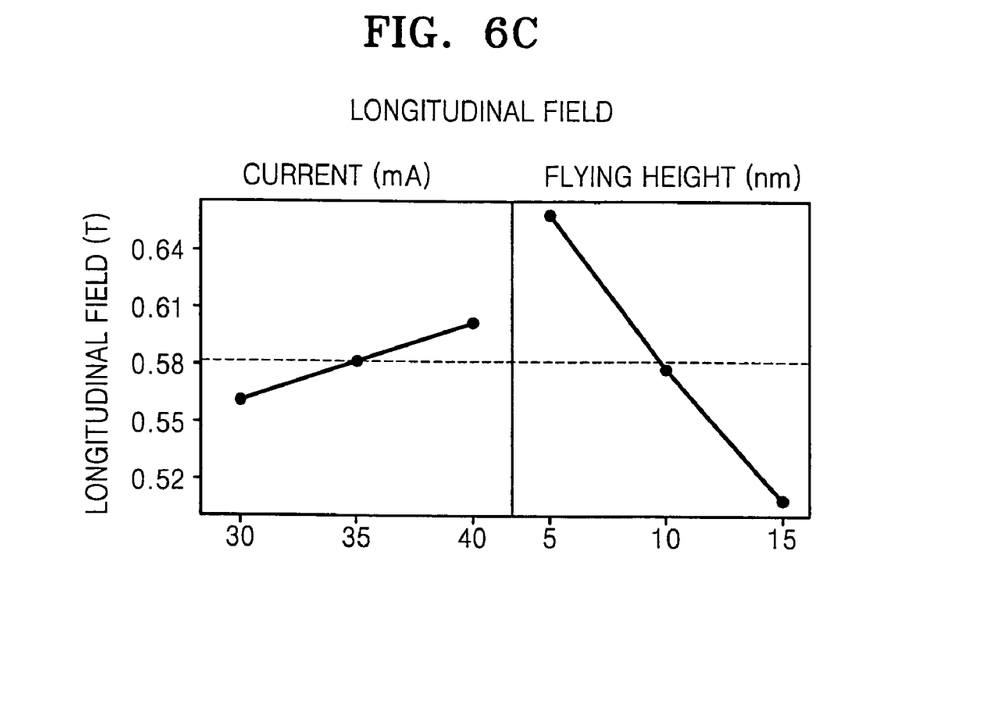
FIG. 6C is a graph showing the change in the recording field according to the application current and the flying height of the read/write head, as a profile of the recording field in the vertical direction applied to the disk.
Figure 6D:
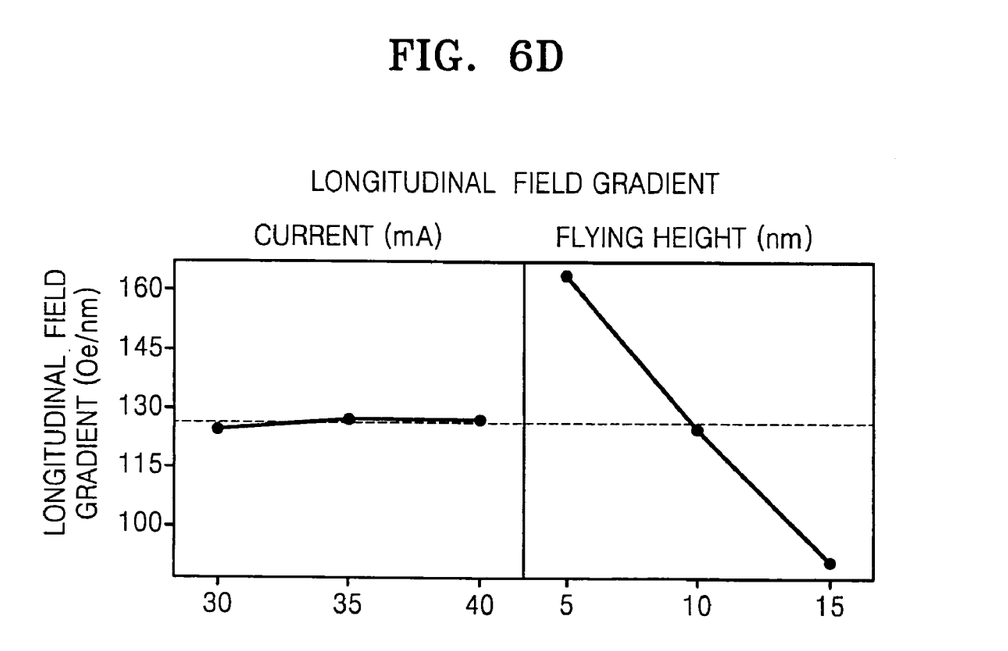
FIG. 6D is a graph showing the change in the spatial gradient according to the application current and the flying height of the read/write head, as a profile of the spatial gradient in the recording field in the vertical direction applied to the disk.

FIGS. 6C and 6D show profiles of the longitudinal field of the disk and a spatial gradient thereof. In FIGS. 6C and 6D, the longitudinal field signifies a magnetic field component following the circumferential direction of a particular track among the recording field applied to the disk when the read/write head 150 performs a recording function while following the particular track of the disk 120. Referring to FIGS. 6C and 6D, the longitudinal field, or a spatial gradient thereof, shows a gentle change to the intensity of the applied current but a radical change to the change in the flying height of the read/write head 150. This result is similar to that described in FIGS. 6A and 6B.

The sensitive response of the recording field or longitudinal field to the change in flying height is due to the corresponding intensity of a magnetic field which rapidly decreases in inverse proportional to the cube of a radiation distance. Thus, since the recording field will vary with high sensitivity to even minute changes in the flying height of the read/write head 150, the intensity of the recording field may be more effectively reinforced to a desired level by accurately controlling the flying height. For example, when the flying height of the read/write head 150 is reduced by 5 nm, the resulting effect is similar to increasing the current signal by 10-20 mA. Thus, a bit error rate (BER) that shows accuracy in recording can be improved by about 3.5 orders of magnitude.

The operation device 145 as described within the context of embodiments of the invention effectively controls the flying height of the read/write head 150 in relation to temperature changes. At an assumed operating temperature around room temperature, a predetermined thickness of Tr is maintained such that the read/write head 150 floats at an ideal flying height of, for example, 10 nm, above disk 120. However, at a relatively lower temperature, the operation device 145 vertically expands to a thickness of Tc greater than Tr. Accordingly, the read/write head 150 attached to the operation device 145 extends more closely towards the disk 120 by a difference of (Tc−Tr). That is, the operation device 145 prevents weak write signals due to the temperature changes by controlling the flying height of the read/write head 150 in view of the magnetic characteristics of disk 120 over a defined temperature range. The flying height of the read/write head 150 is preferably changed in accordance with a relatively minute scale (e.g., defined over a range of only several nanometers). The SMA actuator material used to implement the operation device 145 is suitable for such minute adjustment displacements.

Since the operation device 145 according to the present embodiment is controlled in a passive manner that is dependent upon the temperature change, an additional circuit board adapted to drive the operation device 145 or an interface for detecting and/or compensating for a weak recording/reproduction signal is not needed. Accordingly, since additional installation space required for the foregoing is not needed, miniaturization of the HDD is further enabled. In particular, since increased drive power is not needed, the design of the overall drive apparatus may be simplified.

As described above with reference to FIG. 4, the read/write head 150 includes the first and second poles 153 and 154 used to form a magnetic flux that selectively magnetizes the surface of disk 120. The first and second poles 153 and 154 are commonly made of a soft magnetic material, for example, FeNi, so that the magnetic flux may be rapidly changed in response to a high frequency write signal.

The first and second poles 153 and 154 are protected by being embedded in a protective layer made of a ceramic material such as alumina ($Al_2O_3$) or titanium oxide (TiC). When the head slider 140 is exposed to relatively high temperatures, due to a difference in the thermal expansion coefficients between the first and second poles 153 and 154 and the protective layer, the first and second poles 153 and 154 may protrude together with the surrounding protective layer towards the disk 120 (i.e., the thermal pole tip protrusion phenomenon occurs). Besides an increase in the operating temperature, the thermal pole tip protrusion phenomenon may occur as the read/write head 150 is heated by application of a high frequency current signal. As the first and second pole tips 153 and 154 protrude under the influence of thermal energy, a space "g" between the first and second pole tips 153 and 154 and the disk 120 decreased below a minimum tolerance value. Under such conditions, it is possible that the disk 120 may contact the first and second pole tips 153 and 154.

Figure 7A:
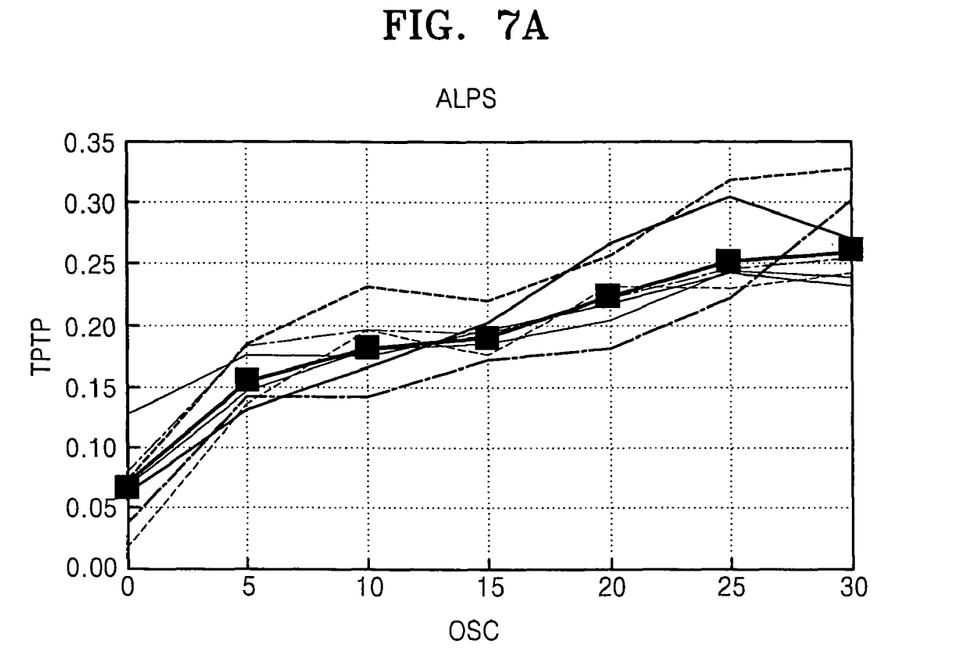
FIGS. 7A and 7B are graphs showing the result of the measurement of in different drive models, as a profile showing a degree of protrusion of the pole tip according to the application current of the read/write head.
Figure 7B:
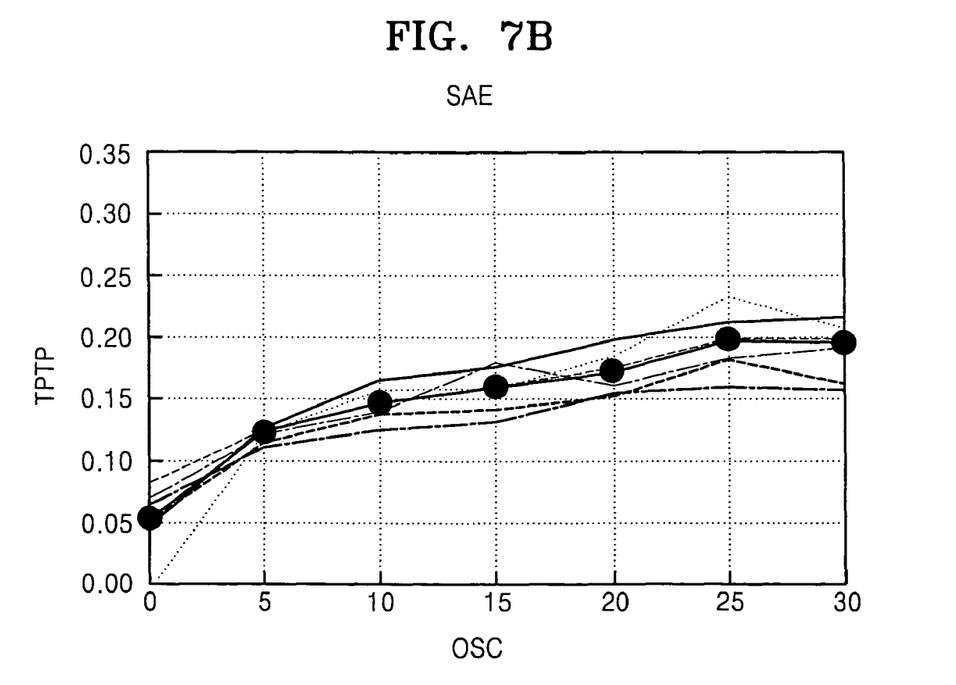

FIGS. 7A and 7B show profiles which indicate a degree of protrusion for a model pole tip (TPTP) according to the current applied to the read/write head in different HDD models. Referring to FIGS. 7A and 7B, over-shoot current (OSC) illustrated on the horizontal axis indicates the intensity of the write current applied as alternating current (AC). It can be seen from the drawings that the pole tip protrudes in almost direct proportion with increases in the current signal.

Should a vertically oriented external shock be applied, under conditions where a pole tip protrusion is apparent, an impact between the read/write head 150 and the disk 120 may occur. That is, as the read/write head 150 follows a particular disk track during a read/write operation, it typically vibrates in the vertical direction while being supported from suspension 133 which allows such movement as it undergoes elastic deformation. In this state and with pole tip protrusion apparent, an external shock may well drive the read/write head 150 into the disk 120, thereby damaging the read/write head 150 and/or the disk 120. In particular, when the pole tip thermally expands and protrudes toward the disk 120, a head disk interface (HDI) margin with the disk 120 is reduced and the danger of collision with the disk 120 further increases. Accordingly, by controlling the spacing between the read/write head 150 and the disk 120 in relation to the operating temperature, the danger of collision with the disk 120 due to the protrusion of the pole tip may be prevented.

The operation device 145 controls the flying height of the read/write head 150 while vertically expanding and contracting in relation to changes in the operating temperature. The temperature of the read/write head 150 increases as the current signal is applied. As the operation device 145 closes to the read/write head 150 it is similarly heated, and the operation device 145 contracts from a room temperature thickness of Tr towards a higher temperature thickness of Th. Accordingly, the read/write head 150 floats at a flying height raised above the disk 120 with a safe separation tolerance adequate to absorb the ill-influences of an unexpected impact.

Subsequently, when an operating temperature for the read/write head 150 decreases from an assumed room temperature or changes in an applied current, the operation device 145 expands back towards the original thickness of Tr. Accordingly, the flying height of the read/write head 150 is returned to FHr so that the spacing remains appropriate for a superior signal recording.

Figure 8A:
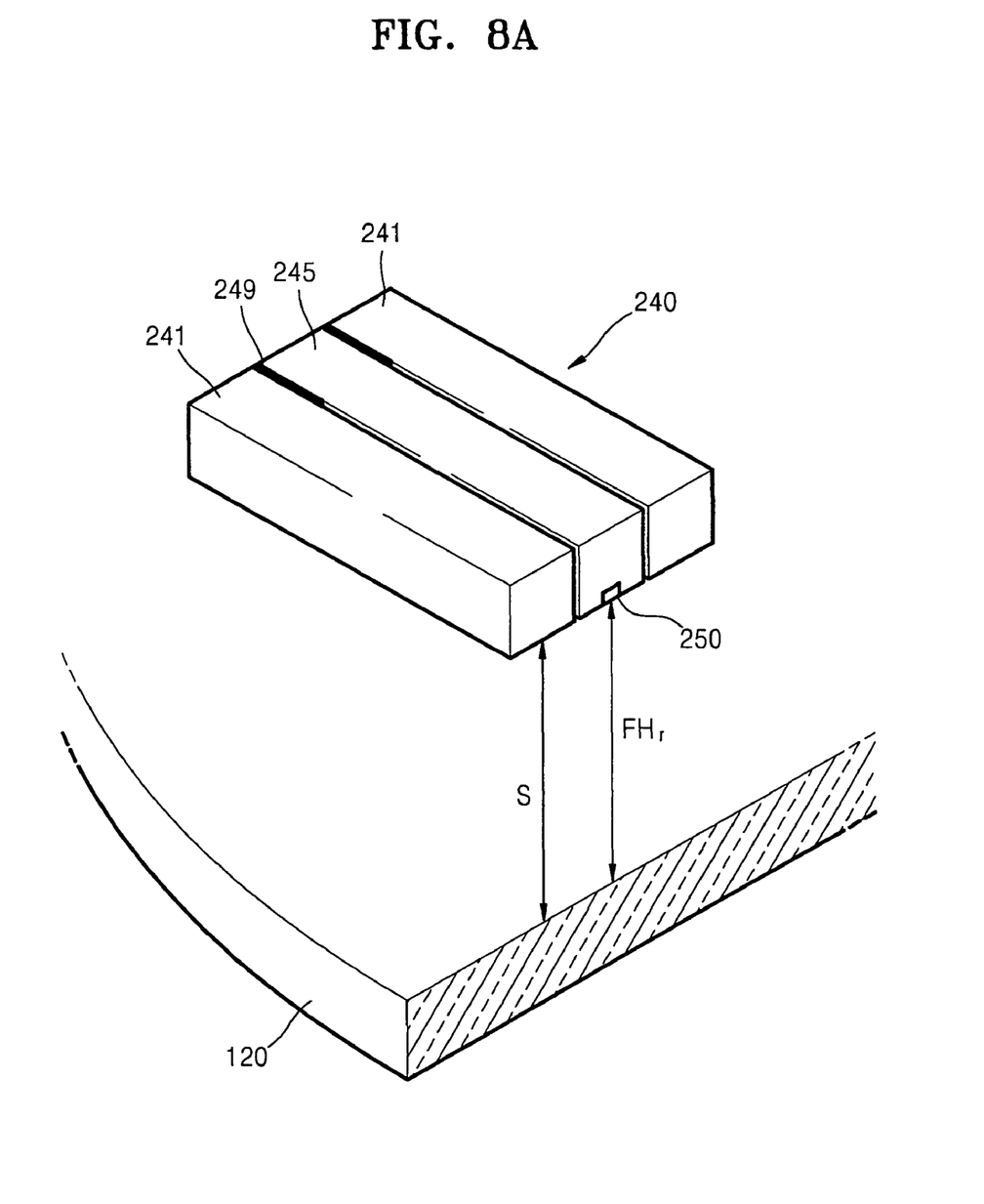
FIGS. 8A through 8C are perspective views of the head slider according to other embodiments of the invention, showing the operation of the head slider in the environments of different temperatures.
Figure 8B:
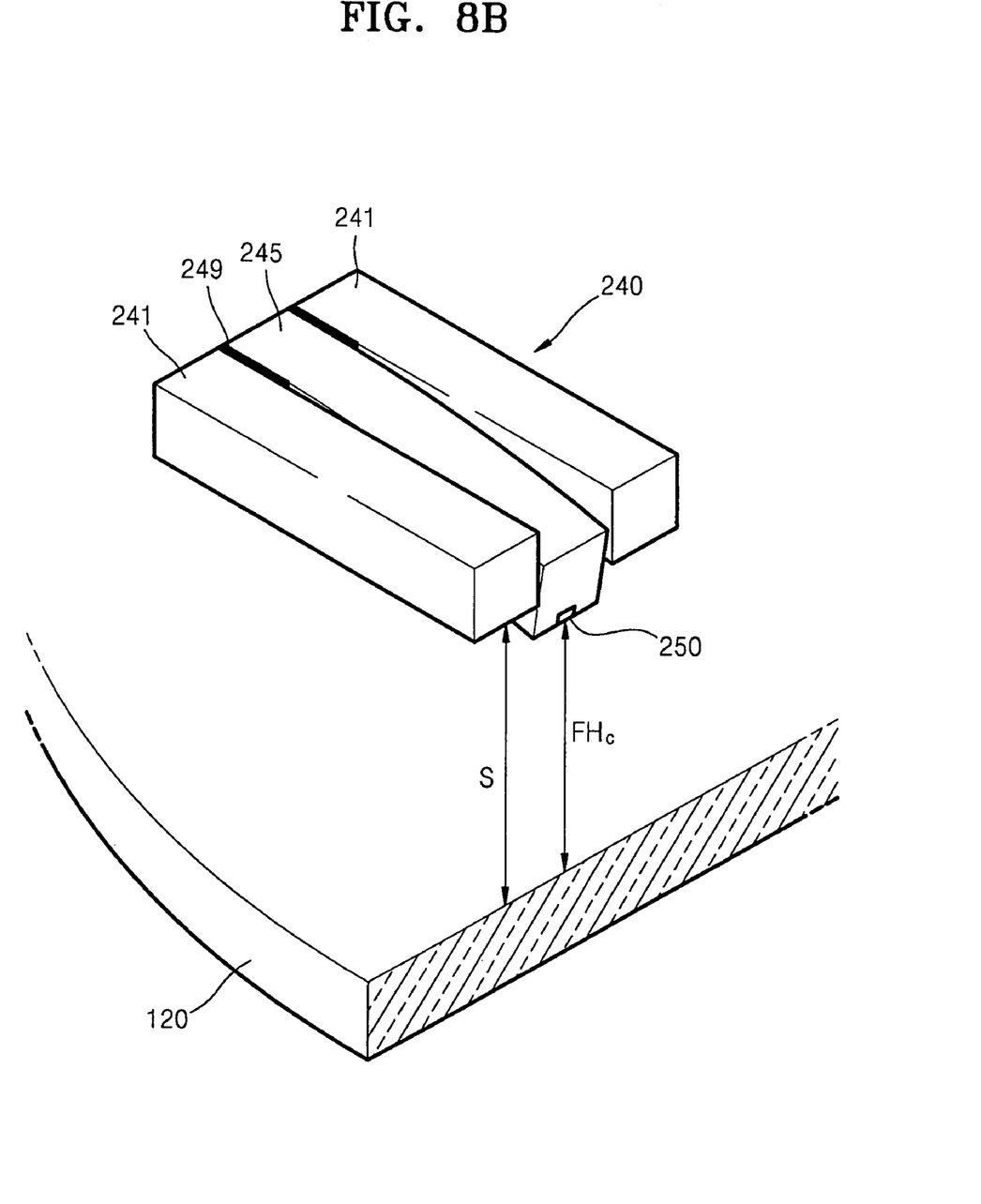
Figure 8C:
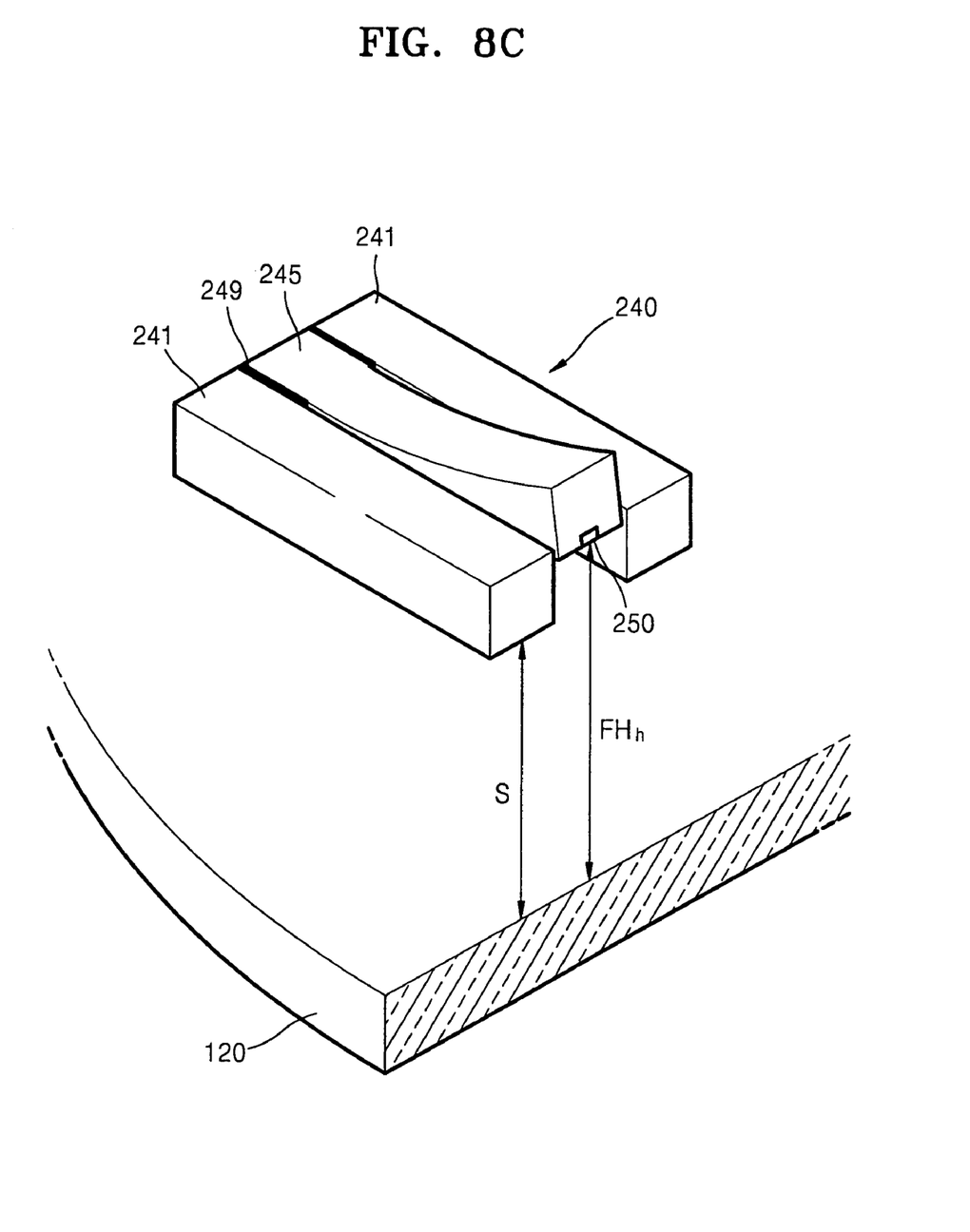

FIGS. 8A through 8C are perspective views of the head slider according to embodiments of the invention and further illustrate operation of the head slider in the environments of different temperatures. Referring to FIGS. 8A through 8C, a head slider 240 includes a read/write head 250 for recording and reproducing and a slider as a support structure thereof. In the present embodiment, the slider includes beam-shaped members (241 and 245) extending parallel to each other and contacting each other laterally. That is, the slider includes an operation member 245 having the read/write head 250 attached to a tip end thereof and first and second support beams 241 supporting the operation member 245 from the left and right sides with respect to the operation member 245 interposed therebetween.

The support beam 241 and the operation member 245 contact each other from the lateral sides thereof. The support beams 241 and the operation member 245 are partially coupled to each other at a rear end position opposite to the read/write head 250, for example, by an adhesive layer 249 interposed therebetween. At the tip end where the read/write head 250 is located, the support beams 241 and the operation member 245 are not coupled to each other but maintained separated from each other with a minute gap capable of sliding with respect to each other, so as to allow a free bending deformation of the operation member 245. As the operation member 245 is bent upward or downward, the read/write head 250 attached to the tip end of the operation member 245 can approach or be separated from the disk 120.

The support beams 241 and the operation member 245 can be coupled to each other using an additional coupling member (not shown) extending across them, for example, not by the adhesive layer 249 interposed therebetween. Although not shown in the drawings, the head slider 240 is attached to the suspension 133 (FIG. 1). The support beams 241 can be directly attached to suspension 133 or the operation device 145 shown in FIG. 3 can be indirectly supported by the suspension 133 through the support beams 241.

The support beams 241 have superior rigidity and anti-abrasion features to perform a function to support and protect the operation member 245 located at the center position. The support beams 241 are preferably formed of a non-magnetic material to avoid a recording/reproducing error due to a magnetic interference, typically formed of a ceramic material including alumina ($Al_2O_3$) and titanium oxide (TiC).

The read/write head 250 performing the data recording/reproducing function through the magnetic interaction with the disk 120 is attached to the tip end of the operation member 245. Since the detailed structure of the read/write head 250 is substantially the same as that described with reference to FIG. 4, a detailed description thereof will be omitted herein. The operation member 245 passively controls the flying height of the read/write head 250 in response to the temperature conditions. By doing so, the deterioration of recording characteristics for the disk 120 according to the temperature change and/or the danger of head collision against the disk 120 due to the protrusion of the pole tip may be prevented. The operation mechanism of the operation member 245 is distinguished from that of the operation device 145 shown in FIG. 3 in that the operation member 245 controls the flying height of the read/write head 250 attached to the tip end thereof not through the expansion and contraction in volume, but through the bending deformation thereof.

As the operation member 245, the SMA actuating material whose external shape changes as the internal crystal structure changes according to the temperature change or an actuator having a bimetal structure formed by depositing two or more metal thin plates having different thermal expansion coefficients so that bending deformation is generated in response to the temperature change can be applied.

As shown in FIG. 8A, at an assumed room temperature, the operation member 245 can maintain a horizontal posture parallel to the support beam 241. The read/write head 250 attached to the tip end of the operation member 245 maintains a predetermined flying height FHr, for example, 10 nm, with respect to the disk 120. In the meantime, at relatively lower temperatures, as shown in FIG. 8B, the operation member 245 is bent downward so that the read/write head 250 attached to the tip end thereof approaches the disk 120 and the flying height thereof is lowered to FHc. Thus, the read/write head 250 may be located more closely towards the disk 120 whose recording characteristics may have deteriorated at the relatively lower temperatures.

Meanwhile, at relatively higher temperatures, as shown in FIG. 8C, the operation member 245 is bent upward so that the read/write head 250 attached to the tip end of the operation member 245 is further separated from the disk 120 and the flying height thereof is increased to FHh. Accordingly, the pole tip protrusion that occurs due to thermal expansion is compensated by the change in the shape of the operation member 245.

In the illustrated example, the operation member 245 is substantially parallel to the support beams 241 at room temperature (FHr=S), is bent lower than the support beams 241 at low temperature (FHc<S), and is bent higher than the support beams 241 at high temperature (FHh>S). However, the operation member 245 of the present invention is not limited thereto. For example, if the flying height of the read/write head attached to the tip end thereof is variable according to the temperature change, the operation member 245 may be designed to have a substantially horizontal posture at higher temperatures, is bent downward posture at room temperature, and a further bent posture at lower temperatures.

As described above, the head slider for a hard disk drive according to the present invention includes an operation device which changes the flying height of the read/write head according to the change in the operation temperature. Thus, the general problems due to the change in temperature, that is, the deterioration of characteristic of a disk at low temperature and the HDI problem with the disk according to the pole tip protrusion phenomenon at high temperature can be simultaneously solved.

In particular, in the present invention, since the operation device of a passive driving type that responds to the temperature change is employed, an additional circuit portion to drive the operation device is not needed. As a result, reliability of a product is improved while not affecting power consumption and installation space.

While this invention has been particularly shown and described with reference to preferred embodiments thereof, it will be understood by those skilled in the art that various changes in form and details may be made therein without departing from the scope of the invention as defined by the appended claims.

What is claimed is:

1. A head slider for a hard disk drive including a slider inducing generation of a lift force from a rotating disk and a read/write head attached to a lower surface of the slider and facing a disk, wherein the read/write head is adapted to perform read/write operations while separated from the disk by a flying height, the slider comprising:

at least one support beam extending in a direction; and an operation member formed from a thermally responsive material and arranged in parallel with the support beam, the operation member having a rear end portion laterally fixed to the support beam and a tip end portion opposite the rear end attaching the read/write head and configured to freely move in relation to a proximate tip end portion of the support beam, such that the flying height is changed in relation to temperature by thermally induced deformation of the thermally responsive material, wherein the read/write head is attached to a lower surface of the operation member facing the disk, and an upper surface of the support beam is integrally attached to a lower surface of the slider facing the disk.

2. The head slider of claim 1, wherein the thermally responsive material expands as the temperature decreases and contracts as temperature increases.

3. The head slider of claim 2, wherein the thermally responsive material comprises a shape memory alloy (SMA) actuating material.

4. The head slider of claim 1, wherein the thermally responsive material comprises a bimetal having a structure in which at least two metal members having different thermal expansion coefficients are deposited.

5. The head slider of claim 1, wherein the at least one support beam comprises two beam structures arranged in parallel on lateral opposite sides of the operation member.

6. The head slider of claim 5, wherein the two beam structures and the operation member are laterally arranged in parallel and coupled to each other proximate the read end portion.

* * * * *